United States Patent [19]

Stenger et al.

[11] Patent Number: 5,101,533
[45] Date of Patent: Apr. 7, 1992

[54] VIBRATION DAMPING HINGE JOINTS FOR VARIABLE AREA JET ENGINE EXHAUST NOZZLES

[75] Inventors: Richard E. Stenger; William C. Lippmeier; Joseph S. Alford, all of Cincinnati, Ohio; David O. Fitts, Ballston Spa, N.Y.; Malachi Lawrence, Jr., Menlo Park, Calif.; Keith A. Williams; Douglas M. Fortuna, both of Cincinnati, Ohio

[73] Assignee: General Electric Company, Cincinnati, Ohio

[21] Appl. No.: 419,918

[22] Filed: Oct. 11, 1989

[51] Int. Cl.⁵ .............................................. E05C 17/64
[52] U.S. Cl. ........................................ 16/340; 16/339
[58] Field of Search ............................... 16/337–339, 16/299, 306, 307, 353, 85, 273, 340

[56] References Cited

U.S. PATENT DOCUMENTS

| | | |
|---|---|---|
| 1,046,338 | 12/1912 | Schou . |
| 1,095,641 | 5/1914 | Johnson . |
| 1,890,311 | 12/1932 | Blake . |
| 2,376,965 | 5/1945 | Hellknist ............................ 16/339 |
| 2,471,857 | 5/1949 | Bleakney et al. . |
| 2,714,285 | 8/1955 | Geary . |
| 2,743,131 | 4/1956 | Mieras et al. ........................ 16/337 |
| 2,779,586 | 1/1957 | Schweiss . |
| 2,999,354 | 9/1961 | Gallo et al. . |
| 3,004,385 | 10/1961 | Spears, Jr. et al. . |
| 3,044,258 | 7/1962 | Carlton et al. . |
| 3,355,541 | 11/1967 | Hornberger . |
| 4,128,208 | 12/1978 | Ryan et al. . |
| 4,141,501 | 2/1979 | Nightingale . |
| 4,186,905 | 2/1980 | Brudy .................................. 16/342 |
| 4,188,146 | 2/1980 | Stecklein .......................... 403/158 |
| 4,422,605 | 12/1983 | Fage . |

FOREIGN PATENT DOCUMENTS

| | | | |
|---|---|---|---|
| 484735 | 7/1952 | Canada ................................ 16/299 |
| 1479507 | 5/1967 | France ................................ 16/307 |
| 560583 | 4/1957 | Italy ....................................... 16/85 |
| 293390 | 12/1953 | Switzerland ........................ 16/338 |
| 366687 | 2/1932 | United Kingdom . |
| 1358693 | 7/1974 | United Kingdom . |
| 1484361 | 9/1977 | United Kingdom . |
| 8501923 | 5/1985 | World Int. Prop. O. . |

Primary Examiner—Richard K. Seidel
Assistant Examiner—Chuck Y. Mah
Attorney, Agent, or Firm—Jerome C. Squillaro; David L. Narciso

[57] ABSTRACT

A spring biased bearing is slidably mounted within a clevis joint so as to apply a frictional damping force to a flap of a jet engine exhaust nozzle. A forward hinge joint restrains the bearing against rotation with the flap while an aft hinge joint provides for both rotation and translation of the bearing about the flap. A tubular canister may be used with the hinge joint to preset the axial compression and biasing force generated by a coil spring enclosed within the canister.

10 Claims, 5 Drawing Sheets

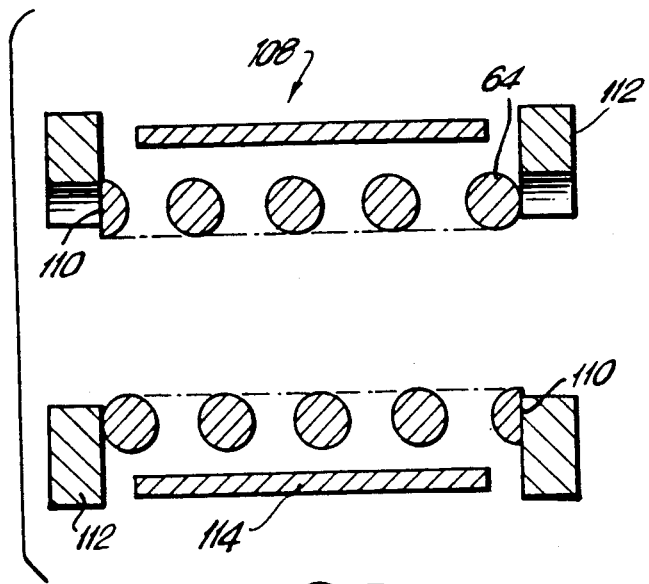
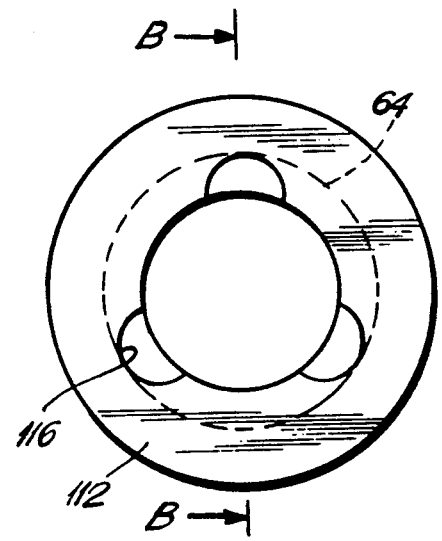
FIG.7    FIG.8
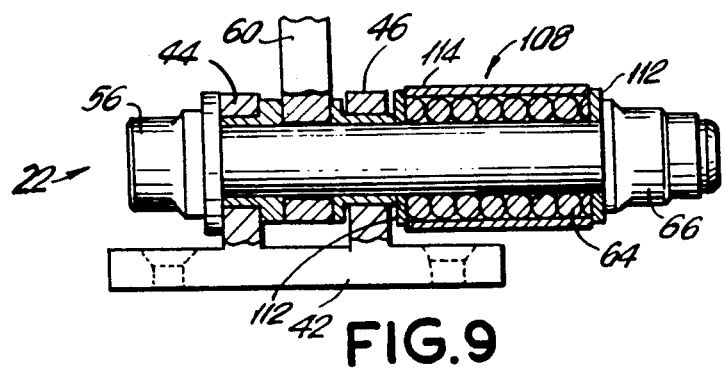
FIG.9
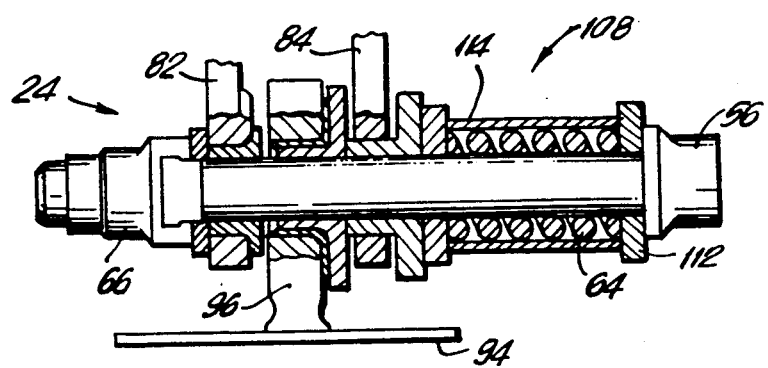
FIG.10

VIBRATION DAMPING HINGE JOINTS FOR VARIABLE AREA JET ENGINE EXHAUST NOZZLES

The Government has rights in this invention pursuant to Contract No. F33657-84-C-0264 awarded by the Department of Air Force.

FIELD OF THE INVENTION

This invention relates generally to exhaust nozzles for jet aircraft and particularly relates to spring biased bearing members which provide frictional resistance between the outer flap of an exhaust nozzle and its support members.

DESCRIPTION OF PRIOR DEVELOPMENTS

A vibration and excitation problem has been associated with aerodynamic forces produced within a turbulent zone located between adjacent exhaust nozzles of high performance jet aircraft. When jet engines are mounted in a side by side relationship on an aircraft wing, a flow separation zone is formed between them. This creates a harsh and hostile environment for the outer flaps of the exhaust nozzles as excitation is encountered between the engines over a broad range of frequencies.

The excitation causes rapid wear of the hinge joints on the outer flaps and limits the useful life of these joints and flaps to a relatively short period. This wear is most severe under the high velocity, low altitude conditions wherein jet aircraft frequently operate. Because of the expense associated with the downtime and complex maintenance of jet aircraft, this wear problem poses a significant operational and economic problem.

Accordingly, a need exists for a relatively low cost solution to the problem of rapid, vibration-induced wear of the hinge joints of jet aircraft exhaust nozzles. A particular need exists for a relatively simple device for reducing vibration induced wear caused by flow separation between a pair of juxtaposed jet engines.

SUMMARY OF THE INVENTION

The present invention has been developed to fulfill the needs noted above and therefore has as a primary object the provision of a vibration damping mechanism for reducing the vibration induced wear of jet engine exhaust nozzle hinge joints.

Another object is to facilitate the installation, preloading and replacement of such vibration damping mechanisms between the outer flap and its associated support members.

These objects are met by a spring-biased bearing assembly which applies a predetermined force to one or more mounting lugs connected to the outer flaps of a jet engine exhaust nozzle. A non-rotating bearing is used to directly apply an axially-directed force against an outer flap mounting lug on the front hinge joint and a pair of spring-loaded axially-movable slider blocks is used to apply a similar force on a pair of outer flap mounting lugs on the rear hinge joints. As the outer flap and its integral mounting lugs are exposed to dynamic excitation forces, these forces are transferred to the front and rear hinge joints. Friction generated on the faces of the mounting lugs by the spring loaded bearings and slider blocks serves to damp vibrations about the hinge joints and extend their useful lives.

A spring canister assembly may be provided to facilitate the installation of the vibration damping bearing assemblies. The canister assembly also facilitates setting of bearing preloads. This is particularly desirable when considering the limited area within the exhaust nozzle assembly which is available to allow an installer to manipulate installation and measurement tools.

The aforementioned objects, features and advantages of the invention will, in part, be pointed out with particularity, and will, in part, become obvious from the following more detailed description of the invention taken in conjunction with the accompanying drawings, which form an integral part thereof.

BRIEF DESCRIPTION OF THE DRAWINGS

FIG. 7 is a sectioned side elevation view of a spring canister assembly taken along line B—B of FIG. 8;

FIG. 8 is an end view of the spring canister of FIG. 7;

FIG. 9 is a fragmental view of the forward hinge joint fitted with a spring canister assembly; and FIG. 10 is a fragmentary view of the rear or aft hinge joint fitted with a spring canister assembly.

In the various figures of the drawing, like reference characters designate like parts.

DESCRIPTION OF THE PREFERRED EMBODIMENT

Figure 1:
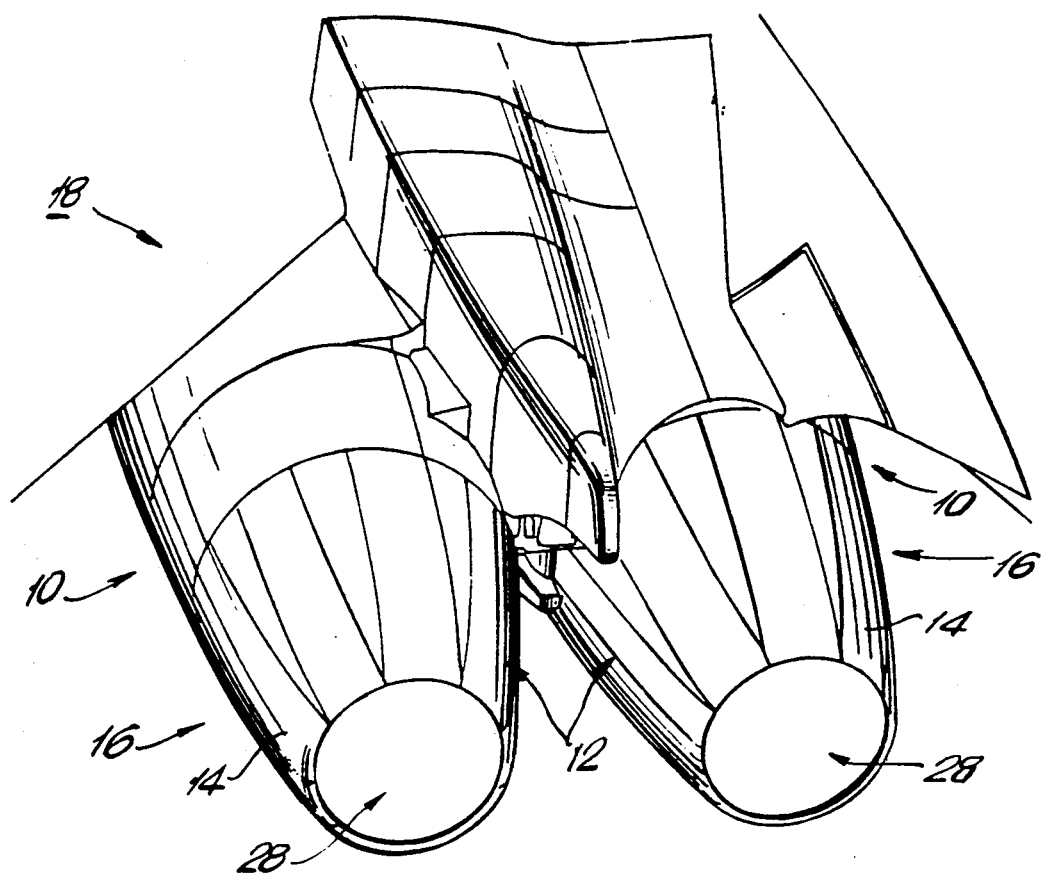
FIG. 1 is a fragmentary perspective schematic view of a pair of jet aircraft exhaust nozzles.
Figure 2:
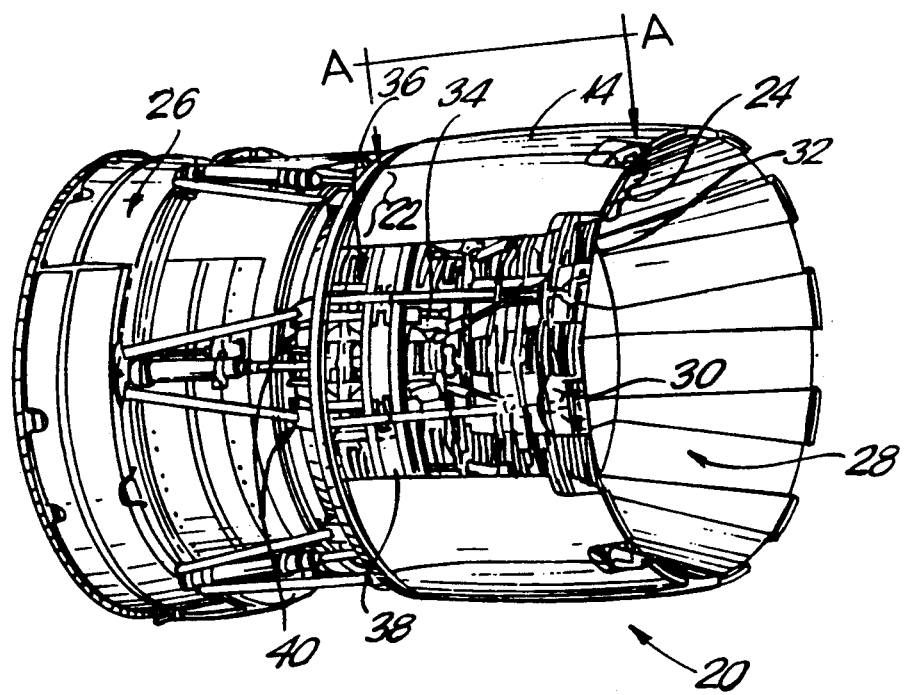
FIG. 2 is a perspective view, partly in section of a typical exhaust nozzle assembly.
Figure 3:
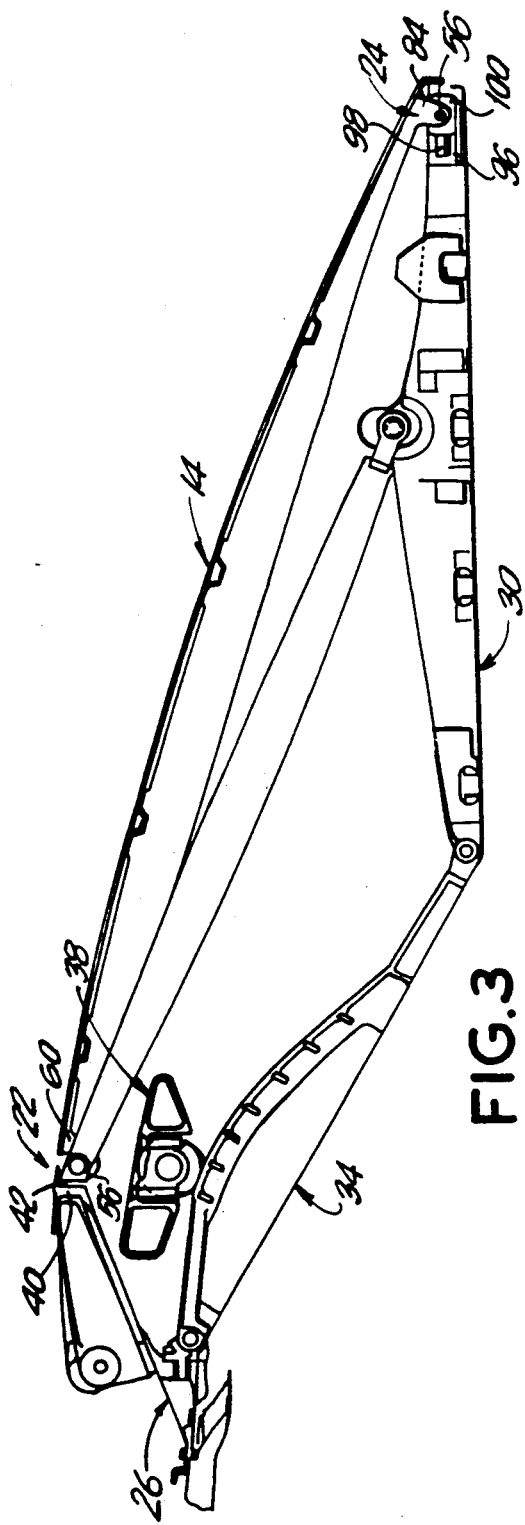
FIG. 3 is a sectional side elevation view taken along line A—A of FIG. 2 showing the major components which form an exhaust nozzle.

As can be appreciated from the details shown in FIG. 1, a pair of aircraft jet engines 10, when in use, typically creates a flow separation zone 12 between the outer flaps 14 of a pair of juxtaposed variable area exhaust nozzles 16. This flow separation is particularly acute in those aircraft configurations which include four jet engines mounted in pairs under the inboard position of each wing 18. As noted above, this excitation and vibration causes rapid wear of the hinge joints which pivotally connect the outer flaps 14 to the exhaust nozzles 16 The general location of the hinge joints is best seen in FIG. 2 wherein an exhaust nozzle assembly 20 is shown as including a plurality of forward hinge joint assemblies 22 and a plurality of rear or aft hinge joint assemblies 24. The exhaust nozzle assembly 20, which includes an circular static exhaust duct 26, is formed of a plurality of pivotally interconnected flaps similar to those disclosed in U.S. Pat. No. 4,128,208, the specification of which is incorporated herein by reference. This pivotal interconnection allows for the selective variation in the cross sectional area of the circular exhaust flow path 28. This variation is desirable to efficiently accommodate the various mass flow rates and fluid states encountered over the range of operating conditions of the jet engine. As seen in FIGS. 2 and 3, the major components of the exhaust nozzle 16 are the divergent flaps 30 and divergent seals 32, the primary flaps 34 and primary seals 36, the outer flaps 14 and actuation ring 38. The forward hinge joint assembly 22 pivotally connects the outer flap 14 to an an annular flange 40 of exhaust duct 26 via mounting bracket 42 while the aft joint assembly 24 pivotally and axially slidably connects the outer flap 14 to the divergent flap 30 as discussed below.

Figure 4:
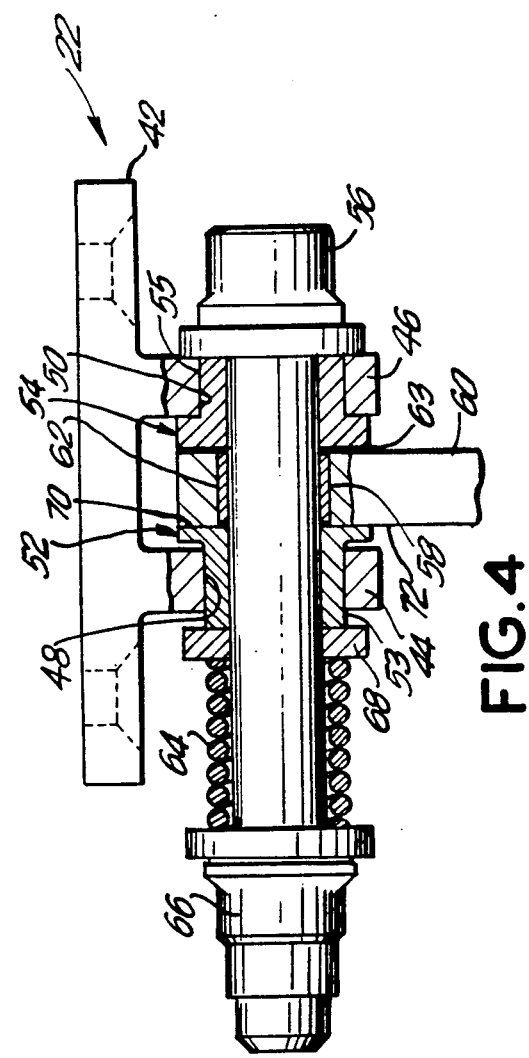
FIG. 4 is a partially sectioned view taken along the pivot axis of a forward hinge joint assembly according to the invention.

Details of the forward hinge joint assembly 22 are shown in FIG. 4. Although two spaced apart assemblies may be used to support each outer flap 14, only one assembly 22 is shown. Mounting bracket 42 is provided with a pair of mounting arms 44, 46 in the form of a clevis. Arm 44 is formed with a square bore 48 while arm 46 is formed with a circular bore 50. A flanged journal bearing 52 having a square outer surface 53 which closely compliments the contour of square hole 48 is fitted within bore 48 with a sliding clearance fit. The square mating surfaces of arm 44 and bearing 52 prevent rotation of bearing 52 with respect to the mounting bracket 42.

A second flanged journal bearing 54 having a circular outer surface 55 is snugly press fit within circular bore 50 formed through arm 46. A hinge pin, such as in the form of flanged bolt 56, is fitted through both bearings 52, 54, and both mounting arms 42, 44. Bolt 56 also passes through a bore 58 formed in an outer flap mounting lug 60 which is located between the bearings 52, 54 and mounting arms 42, 44 in a clevis joint configuration.

A bushing 62 may be provided in bore 58 to rotatably support lug 60 on bolt 56. A clearance 63 is preferably provided between bearing 54 and outer flap mounting lug 60 to allow for tolerances between adjacent forward hinge joint assemblies 22 and particularly between outer flap mounting lugs 60. Clearance 63 thus ensures that each forward hinge joint assembly will fit together properly.

Vibration damping is applied to outer flap 14 through the friction generated by the biasing force of coil spring 64 which is coaxially mounted over the exposed end of bolt 56. The biasing force is set by torquing threaded nut member 66 so as to axially compress spring 64 a predetermined distance against bearing 52 or an intermediary member such as washer 68 which is slidably mounted over bolt 56. The frictional damping force arises from a predetermined axial load applied by spring 64 between the flanged end face 70 of bearing 52 and the side face 72 of outer flap mounting lug 60.

It can be seen that the forward hinge joint assembly 22 is vibrationally damped with an uncomplicated hinge in bushing arrangement which allows restrained rotation of the outer flap 14 around the forward mounting bracket 42. It is the friction between bearing end face 70 and the side face 72 of the mounting lug 60 which damps the response of the forward portion of the outer flap 14 to the aerodynamic forces that exist in the turbulent zone (12) (FIG. 1) surrounding the outer flaps (14). Because bearing 52 is prevented from rotating, the generation of friction between the bearing 52 and mounting lug 60 is ensured upon the rotation of the mounting lug about the bolt 56.

Figure 5:
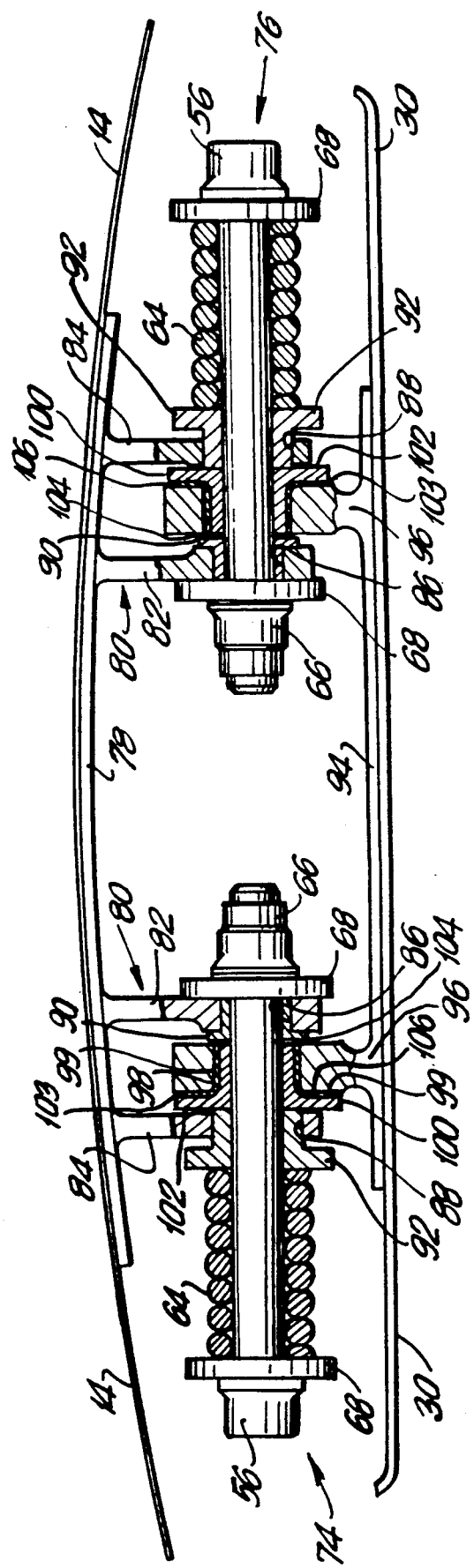
FIG. 5 is a partially sectioned view taken along the pivot axis of a rear hinge joint assembly according to the invention.
Figure 6:
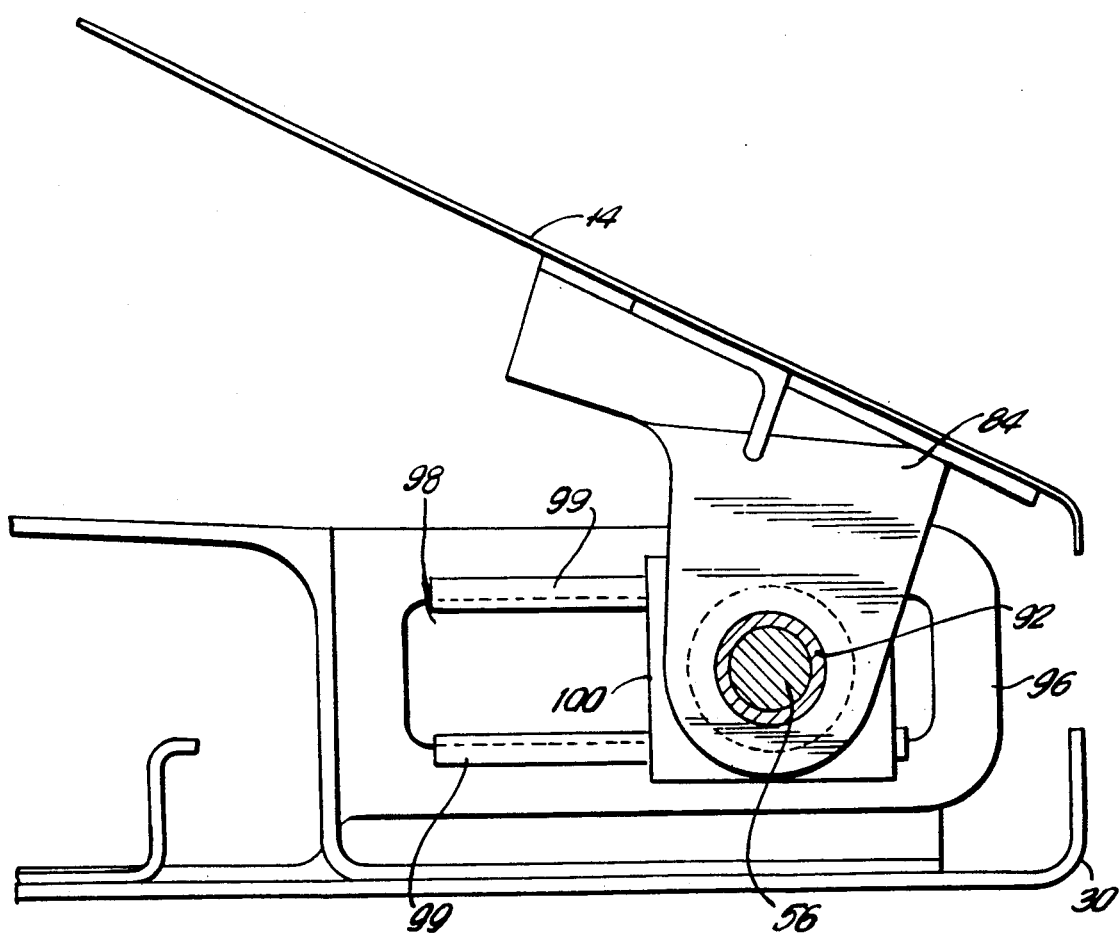
FIG. 6 is a partially sectioned side elevation view of one of the rear hinge joint assemblies.

Although the principal of operation of the aft hinge joint assembly 24 is the same as that described above, the structure of the aft hinge joint assembly 24 is somewhat more complex because it must permit both rotation and translation of the outer flap 14 relative to the divergent flap 30. As seen in FIGS. 5 and 6, the aft hinge joint assembly includes a pair of separate hinge joints 74, 76 of substantially the same configuration but which apply biasing forces in opposed directions although preferably equal in magnitude. For brevity, only one aft hinge joint 74 will be described in detail.

An outer flap mounting bracket 78, which is secured to the outer flap 14 includes a pair of clevis members 80 each having a pair of mounting arms 82, 84. Each mounting arm 82, 84 is respectively formed with a circular bore 86, 88 for respectively receiving a circular flanged bearing 90, 92.

A divergent flap mounting bracket 94 includes a pair of divergent flap mounting lugs 96, with each lug 96 formed with a slot 98 extending along the longitudinal axis of the exhaust nozzle 16. Slot 98 serves as a linear guideway which allows both rotation and linear translation between the outer flap 14 and the divergent flap 30. Slidably fitted within each slot 98 is a slider block 100. A hinge pin such as flanged bolt 56 is fitted through each bearing 90, 92, each mounting arm 82, 84, lug 96 and slider block 100. A pair of replaceable liners 99 is provided between lug 96 and slider block 100 to serve as sacrificial wear members which protect lug 96 from wear.

A coil spring 64 is compressed a predetermined amount between the head of each flanged bolt 56 and each bearing 92 so as to apply a predetermined biasing force against the outer face 102 of each slider block 100. This force is transferred through the slider block 100 to each lug 96 via liners 99. That is, the inner face 103 of each slider block transmits the biasing force of spring 64 via sliding biased contact against liners 99. As in the case of the forward hinge joint assembly 22, the biasing force of spring 64 is set by torquing a nut member 66 a preset distance along each flanged bolt 56. One or more washers 68 may be used in this aft hinge joint assembly in the same manner as in the forward hinge joint assembly.

The mounting arms 82, 84 are spaced and dimensioned with respect to each lug 96, bearing 90 and slider block 100 so as to provide a clearance 104 between bearing 90, lug 96 and slider block 100. This clearance ensures that all significant vibration damping forces are generated between the inner face 103 of the slider block 100 and the side face 106 of lug 96 via liners 99. This clearance further provides for assembly tolerances as noted above.

As the slider block slides along slot 98 as the exhaust nozzle 16 is actuated, axial movement is permitted between the outer flap 14 and the divergent flap 30. Static frictional force between bearing 92 and slider block 100 effectively locks the bearing 92 to the slider block 100 while allowing restrained axial slippage between the slider block 100 and lug 96. This static friction prevents movement between the bearing 92 and slider block 100 when the exhaust nozzle 16 is excited by the separated flow between engines.

The slider block 100 serves two purposes in that it protects the bolt 56 and the slot 98 from each other during impact and frictional wear and it provides a surface 102 against which a biasing force can be applied. As the exhaust nozzle is actuated, the slider block 100 translates along slot 98 so that axial movement is Permitted between the outer flaps 14 and the divergent flaps 30. The flanged bolt 56 which is fitted through a bore in the slider block 100 permits any needed rotation at the aft hinge joints 24.

If the slider block 100 were absent, or if it wore away so the flanged bolt 56 contacted the slot 98 directly, the useful life of the hinge would decrease significantly because the slider block with a rectangular planar contact area, is a much more wear resistant surface design than the cylindrical surface of flanged bolt 56 which would make only a line contact with the slot 98. In addition to providing suitable wear surfaces, the slider block 100 provides a surface 102 which transmits the spring force needed for damping the hinge. The proper biasing of this force is needed to ensure long hinge life.

In order to ensure that the correct biasing force is applied by coil springs 64 in both the forward and aft hinge joint assemblies 22, 24, a spring canister assembly 108 (FIGS. 7 and 8) is used to control the working length of the coil springs 64. Rather than requiring an assembler to rely upon a separate measuring device to set the desired working length of these springs, the spring canister assembly 108 can be used to automatically set this length. This significantly facilitates assembly of the outer flap to the exhaust nozzle and reduces installation and replacement time in light of the restricted working envelope between the outer flap 14 and the divergent flap 30.

Spring canister assembly 108 includes a coil compression spring 64 having its flat ground ends 110 fixed, such as by plug welding, brazing or the like to retaining rings 112, which retain a tubular spring limiter 114 therebetween. Each retaining ring is preferably formed with several scallops 116 evenly spaced around its inner diameter to provide accessibility for welding the spring 64 to the inner face of the retaining rings 112. The spring retainer 114 is dimensioned with a length less than the free length of the coil spring 64 and equal to the desired predetermined compressed working length of the coil springs. The spring retainer is further dimensioned with an inner diameter which allows free radial movement of the coil springs therein.

As seen in FIGS. 8 and 9, when torquing nut 66 to compress the coil springs 64, the spring limiter 114 will eventually contact the retaining rings 112 and thereby prevent further compression of the coil springs. When this occurs, the prescribed working length of the coil springs 64 is achieved. This spring canister assembly is an inseparable assembly part and thus minimizes the quantity of additional separate hinge joint assembly parts.

There has been disclosed heretofore the best embodiment of the invention presently contemplated. However, it is understood that the various changes and modifications may be made thereto without departing from the spirit of the invention.

What is claimed is:

1. An apparatus for damping vibration of a flap of a variable area jet engine nozzle, said apparatus comprising:
    (a) at least one pivot joint interconnecting said flap and said nozzle, said joint comprising biasing means applying a predetermined force to said flap so as to generate a frictional damping force between said joint and said flap during movement of said flap about said joint; and
    (b) wherein said biasing means comprises spring means; and
    (c) wherein said flap comprises a mounting lug pivotally connected to said joint;
    (d) a hinge pin passing through said mounting lug to connect said flap to said nozzle;
    (e) bearing means for supporting said hinge pin within said joint; and
    (f) wherein said joint further comprises a mounting bracket attached to said nozzle with at least one support arm wherein said support arm includes a square bore, said bearing means comprises a first journal bearing and a second journal bearing, and wherein at least said first journal bearing includes a square outer surface which fits within said square bore and which causes said first journal bearing to be non-rotatably fixed to said pivot joint.

2. The apparatus of claim 1, wherein said first journal bearing is slidably mounted over said hinge pin.

3. The apparatus of claim 2, wherein said first journal bearing directly applies said predetermined force to said mounting lug.

4. An apparatus for damping vibration of a flap of a variable area jet engine nozzle, said apparatus comprising:
    (a) at least one pivot joint interconnecting said flap and said nozzle, said joint comprising biasing means applying a predetermined force to said flap so as to generate a frictional damping force between said joint and said flap during movement of said flap about said joint; and
    (b) linear guide means operatively associated with said joint for allowing combined rotation and linear translation of said flap about said joint and wherein said rotation occurs about a first axis and wherein said linear translation occurs along a second axis which is not parallel to said first axis.

5. The apparatus of claim 4, further comprising sliding engagement means for transferring said predetermined force from said biasing means to said flap wherein said sliding engagement means includes a slider block with a rectangular planar contact area, for improved wear resistance, which slideably engages a slot during engine operation.

6. An apparatus for damping vibration of a flap of a variable area jet engine nozzle, said apparatus comprising:
    (a) at least one pivot joint interconnecting said flap and said nozzle, said joint comprising biasing means applying a predetermined force to said flap so as to generate a frictional damping force between said joint and said flap during movement of said flap about said joint; and
    (b) means operatively associated with said joint for setting said predetermined force, wherein:
        (i) said means for setting comprises a limiting means;
        (ii) said limiting means comprises a canister which includes a tubular member, a first retaining ring, and a second retaining ring with said tubular member spaced therebetween said first and said second retaining rings;
        (iii) said biasing means comprises a spring retained within said canister; and
        (iv) said tubular member is dimensioned such that its length is less than the free length of said spring, thereby limiting the compression of said spring.

7. A pivot joint for applying a vibration damping frictional force to a pivoting lug of a flap of a variable area jet engine nozzle, said joint comprising:
    a mounting bracket;

at least one support arm provided on said mounting bracket;

a bearing slidably supported by said at least one support arm;

a pivot pin pivotally connecting said at least one support arm to said pivoting lug;

and biasing means operatively associated with said pivot joint for biasing said bearing toward said lug for generating said frictional force.

8. The joint of claim 7 further comprising guide means and a slider block located between said lug and said bearing and engaging within said guide means wherein said guide means is operatively associated with said joint for allowing combined rotation and linear translation of said nozzle flap lug about said joint wherein said rotation occurs about a first axis and wherein said linear translation occurs along a second axis which is not parallel to said first axis.

9. The joint of claim 8, wherein said guide means comprises a lug formed with an elongated guide surface for engaging said slider block which includes a rectangular planar contact area, wherein said planar contact area provides a surface with improved wear resistance, relative to that of a cylindrical surface, thereby enhancing the useful life of said joint.

10. A pivot joint for applying a vibration damping frictional force to a pivoting lug, said joint comprising:

a mounting bracket;

at least one support arm provided on said mounting bracket;

a bearing slideably supported by said at least one support arm;

a pivot pin pivotally connecting said at least one support arm to said pivoting lug;

biasing means operatively associated with said pivot joint for biasing said bearing toward said lug for generating said frictional force;

said at least one support arm comprises a first support arm and a second support arm each connected to said mounting bracket so as to form a clevis.

* * * * *